(12) United States Patent
Jin

(10) Patent No.: US 9,643,530 B2
(45) Date of Patent: May 9, 2017

(54) DAYTIME RUNNING LIGHT APPARATUS FOR VEHICLE

(71) Applicants: Hyundai Motor Company, Seoul (KR); Kia Motors Corporation, Seoul (KR)

(72) Inventor: Yo Han Jin, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/215,320

(22) Filed: Jul. 20, 2016

(65) Prior Publication Data

US 2017/0057400 A1 Mar. 2, 2017

(30) Foreign Application Priority Data

Aug. 28, 2015 (KR) .................. 10-2015-0121423

(51) Int. Cl.
*B60Q 1/26* (2006.01)
*B60Q 1/14* (2006.01)

(52) U.S. Cl.
CPC .......... *B60Q 1/143* (2013.01); *B60Q 2400/30* (2013.01)

(58) Field of Classification Search
CPC .... B60Q 3/0293; B60Q 11/005; B60Q 1/387; B60Q 1/2603; B60Q 3/048; B60Q 1/44; B60Q 1/143; B60Q 1/1423; B60Q 2300/112

USPC ......................... 315/77–79, 80, 82
See application file for complete search history.

(56) References Cited

U.S. PATENT DOCUMENTS

2009/0196060 A1* 8/2009 Sazuka .................... B60Q 1/14
362/509
2012/0051077 A1* 3/2012 Arai ...................... F21S 48/115
362/516

FOREIGN PATENT DOCUMENTS

KR 10-2002-0053608 A 7/2002
KR 10-2015-0012775 A 2/2015
KR 10-2015-0069369 A 6/2015

* cited by examiner

*Primary Examiner* — Minh D A
(74) *Attorney, Agent, or Firm* — Morgan Lewis & Bockius LLP

(57) ABSTRACT

A daytime running light apparatus for a vehicle may include a lamp disposed in a daytime running light for a vehicle, configured to receive information about a vehicle starting condition, and determine whether to turn on the daytime running light, and a controller coupled to the lamp to control an amount of light of the daytime running light in accordance with illumination intensity or brightness at a periphery of the vehicle, in which the controller may be adapted to increase the amount of light of the daytime running light in proportion to an increase in illumination intensity or brightness at the periphery of the vehicle.

5 Claims, 3 Drawing Sheets

DAYTIME RUNNING LIGHT APPARATUS FOR VEHICLE

CROSS-REFERENCE TO RELATED APPLICATION

The present application claims priority to Korean Patent Application No. 10-2015-0121423, filed Aug. 28, 2015, the entire contents of which is incorporated herein for all purposes by this reference.

BACKGROUND OF THE INVENTION

Field of the Invention

The present invention relates to a daytime running lighting apparatus for a vehicle. More particularly, the present invention relates to a daytime running lighting apparatus for a vehicle, which changes a light amount of a daytime running light in accordance with peripheral illumination intensity or brightness.

Description of Related Art

In general, it is effective, in terms of safety, that a driver turns on external lamps of a vehicle, for example, headlamps or tail lamps so as to recognize the existence of the vehicle to other drivers in front of or behind the vehicle in a case in which the surrounding environment is dark like in the nighttime or visibility is poor because of snowy or rainy weather even during the daytime.

Actually, in the countries at high latitude such as Northern Europe or Canada where heavy fog often occurs during the daytime, a driver is obligated to turn on a daytime running light (DRL) having a regulated light amount or larger when the driver drives the automobile during the daytime.

Therefore, to meet this obligation in Northern Europe or Canada, the daytime running light, which is turned on only when the automobile travels during the daytime, is separately installed in the automobile, or the existing external lamps of the automobile, for example, headlamps or tail lamps are utilized as the daytime running light.

However, the daytime running light may cause light blindness to a driver in the oncoming vehicle and a pedestrian at a location where the surrounding environment is dark, but if the designed light amount of the daytime running light is adjusted to be small in order to solve the problem of light blindness, performance of recognizing the daytime running light may deteriorate at a bright location, which may compromise the purpose of safe driving to be achieved by recognizing the daytime running light.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a daytime running light apparatus for a vehicle, which is capable of preventing light blindness to a driver in the oncoming vehicle and a pedestrian by changing a light amount of a daytime running light in accordance with peripheral illumination intensity or brightness.

According to various aspects of the present invention, a daytime running light apparatus for a vehicle may include a lamp disposed in a daytime running light for a vehicle, configured to receive information about a vehicle starting condition, and determine whether to turn on the daytime running light, and a controller coupled to the lamp to control an amount of light of the daytime running light in accordance with illumination intensity or brightness at a periphery of the vehicle, in which the controller may be adapted to increase the amount of light of the daytime running light in proportion to an increase in illumination intensity or brightness at the periphery of the vehicle.

The controller may receive information relating to the illumination intensity or the brightness at the periphery of the vehicle from a photo sensor and a rain sensor pre-installed in the vehicle.

The controller may include a bypass module to check whether a temperature reaches a limit temperature relating to damage to the interior of the lamp and to selectively block the output of the lamp when it is determined that the vehicle is positioned in an intensely hot location.

The controller may be coupled to a Global Positioning System (GPS) receiver which provides position information of the vehicle.

The controller may control for a state of the daytime running light according to an operation of the bypass module to be displayed on an instrument panel in the vehicle.

According to the present invention, since the light amount of the daytime running light is changed in accordance with illumination intensity or brightness at the periphery of the vehicle, it is possible to allow the driver to safely drive the vehicle by improving performance of recognizing the daytime running light, and it is possible to prevent light blindness to a driver in the oncoming vehicle and a pedestrian.

In the present invention, the peripheral illumination intensity and brightness are sensed by the photo sensor and the rain sensor basically mounted in the vehicle, thereby reducing manufacturing costs.

In the present invention, when the internal temperature of the system becomes the predetermined damage limit temperature or higher, the system capacity is decreased to 50% or less by bypassing the electric circuit, thereby minimizing the likelihood of damage to the system caused by a problem of heat resistance performance.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
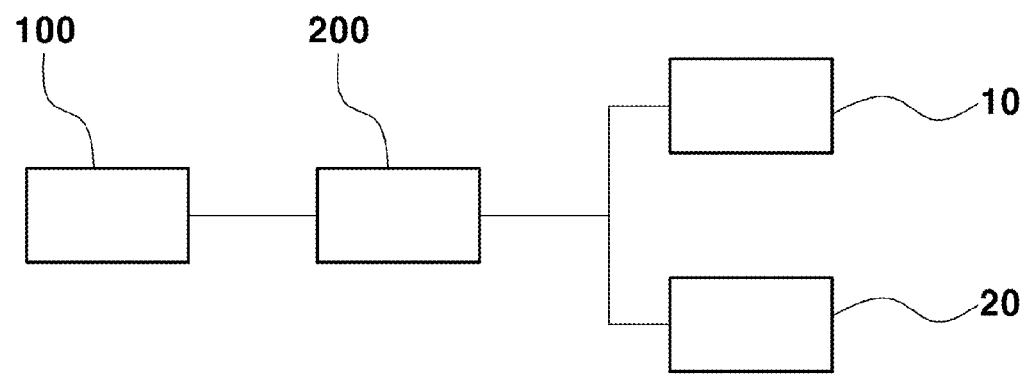
FIG. 1 is a view schematically illustrating a configuration of an exemplary daytime running light apparatus for a vehicle according to the present invention.
Figure 2:
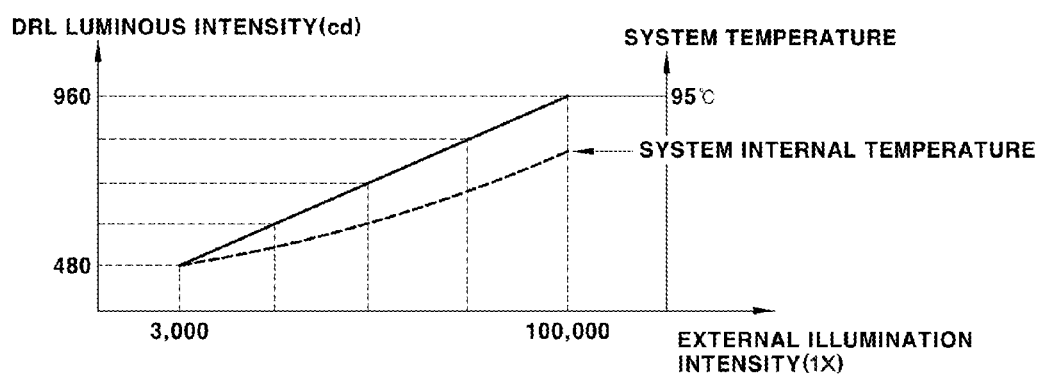
FIG. 2 is a graph illustrating an operational state of the exemplary daytime running light apparatus for a vehicle according to the present invention.

FIG. 1 is a view schematically illustrating a configuration of a daytime running light apparatus for a vehicle according to various embodiments of the present invention, and FIG. 2 is a graph illustrating an operational state of the daytime running light apparatus for a vehicle according to the various embodiments of the present invention.

As illustrated in FIG. 1, the daytime running light apparatus for a vehicle includes a lamp 100 and a controller 200. The lamp 100 is installed in a daytime running light (DRL) for a vehicle, and receives information about a vehicle start, and determines whether to turn on the daytime running light. The controller 200 is connected with the lamp 100, and controls a light amount of the daytime running light in accordance with illumination intensity or brightness at the periphery of the vehicle. The controller 200 may increase the light amount of the daytime running light in proportion to an increase in illumination intensity or brightness at the periphery of the vehicle. That is, because the light amount of the daytime running light in the related art needs to be fixed to 400 to 1200 candela (cd) in order to meet the regulations, the daytime running light may cause light blindness to a driver in an oncoming vehicle and a pedestrian at a location where the surrounding environment is dark.

In more detail, if the light amount of the daytime running light, which is fixed to 400 to 1200 cd, is output in a state in which the surrounding environment of the vehicle is dark, the daytime running light appears to be relatively brighter than the surrounding environment, thereby causing light blindness to a driver in the oncoming vehicle and a pedestrian. In contrast, if the light amount of the daytime running light, which is fixed to 400 to 1200 cd, is output in a state in which the surrounding environment of the vehicle is bright, a difference between the daytime running light and the surrounding environment is small, and thus performance of allowing a driver in the oncoming vehicle to recognize the daytime running light deteriorates, such that the daytime running light cannot play its role.

Therefore, in various embodiments of the present invention, the light amount of the daytime running light may be changed by the controller 200 in accordance with the surrounding environment of the vehicle, and as a result, it is possible to achieve safe driving of a vehicle driver and minimize inconvenience for a driver in the oncoming vehicle and a pedestrian. Here, the controller 200 according to various embodiments receives the degree of illumination intensity or brightness at the periphery of the vehicle from a photo sensor and a rain sensor which are installed in the vehicle in advance. Therefore, in various embodiments, a separate device for obtaining information on illumination intensity and brightness at the periphery of the vehicle is not installed, but the peripheral illumination intensity and brightness may be sensed by means of the photo sensor and the rain sensor basically installed in the vehicle, thereby reducing manufacturing costs.

Meanwhile, a change in luminous intensity of the daytime running light according to illumination intensity outside the vehicle will be described below with reference to the graph illustrated in FIG. 2. First, when it is confirmed that the external illumination intensity, which is sensed and transmitted by the photo sensor and the rain sensor, is 3000 lux (lx) which is relatively dark (based on a condition in which an auto-light of the vehicle is turned off), the controller 200 controls the lamp 100 so as to output luminous intensity of the daytime running light, which is about 480 cd that is 120% of a minimum value of a regulated light distribution of the daytime running light. The reason is to prevent light blindness from occurring to a driver in an oncoming vehicle and to a pedestrian by decreasing the light amount of the daytime running light in accordance with illumination intensity or brightness at the periphery of the vehicle when the surrounding environment of the vehicle is relatively dark.

When it is confirmed that the illumination intensity and the brightness at the periphery of the vehicle are increased and thus the external illumination intensity, which is sensed and transmitted by the photo sensor and the rain sensor, is 100,000 lx, the controller 200 controls the lamp 100 so as to output luminous intensity of the daytime running light, which is about 960 cd that is 80% of a maximum value of the regulated light distribution of the daytime running light.

In this case, if the designed light amount of the daytime running light is adjusted to be small (400 to 700 cd) only for preventing light blindness to a driver in the oncoming vehicle and a pedestrian, a difference between the daytime running light and the illumination intensity at the periphery of the vehicle is small at a position where the external illumination intensity is 100,000 lx as described above, and as a result, performance of allowing a driver in the oncoming vehicle to recognize the daytime running light may deteriorate, which may compromise the purpose of safe driving to be achieved by recognizing the daytime running light.

Consequently, in the various embodiments, the controller 200 controls the light amount of the daytime running light so that the light amount of the daytime running light is controlled in proportion to an increase in illumination intensity or brightness at the periphery of the vehicle, and accordingly, the luminous intensity of the daytime running light is increased, and as a result, it is possible to prevent light blindness to a driver in the oncoming vehicle and a pedestrian, which is caused by the daytime running light, by decreasing the light amount of the daytime running light at a relatively dark location, and it is possible to allow the driver to safely drive the vehicle by improving performance of recognizing the daytime running light by increasing the light amount of the daytime running light at a bright location.

Figure 3:
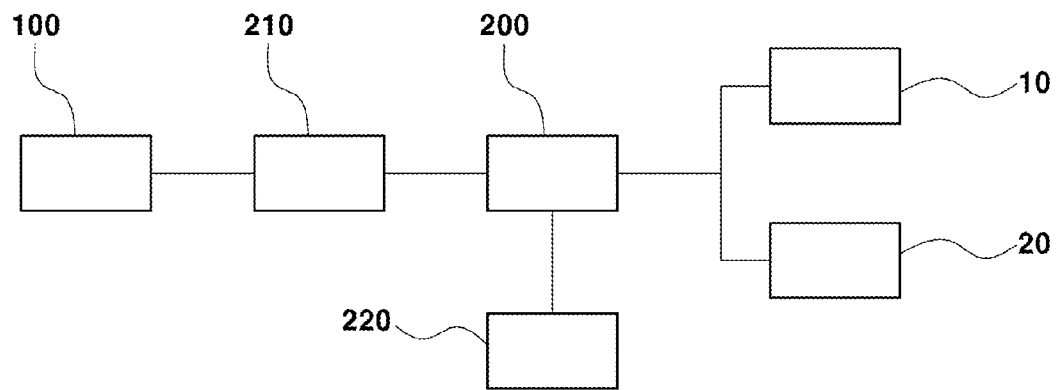
FIG. 3 is a view illustrating a configuration of an exemplary daytime running light apparatus for a vehicle according to the present invention.
Figure 4:
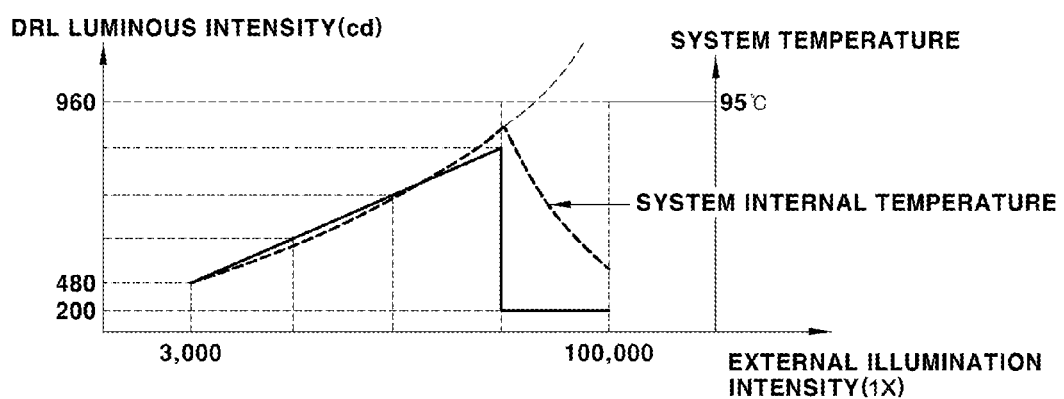
FIG. 4 is a graph illustrating an operational state of the exemplary daytime running light apparatus of FIG. 3, for a vehicle according to the present invention.
Figure 5:
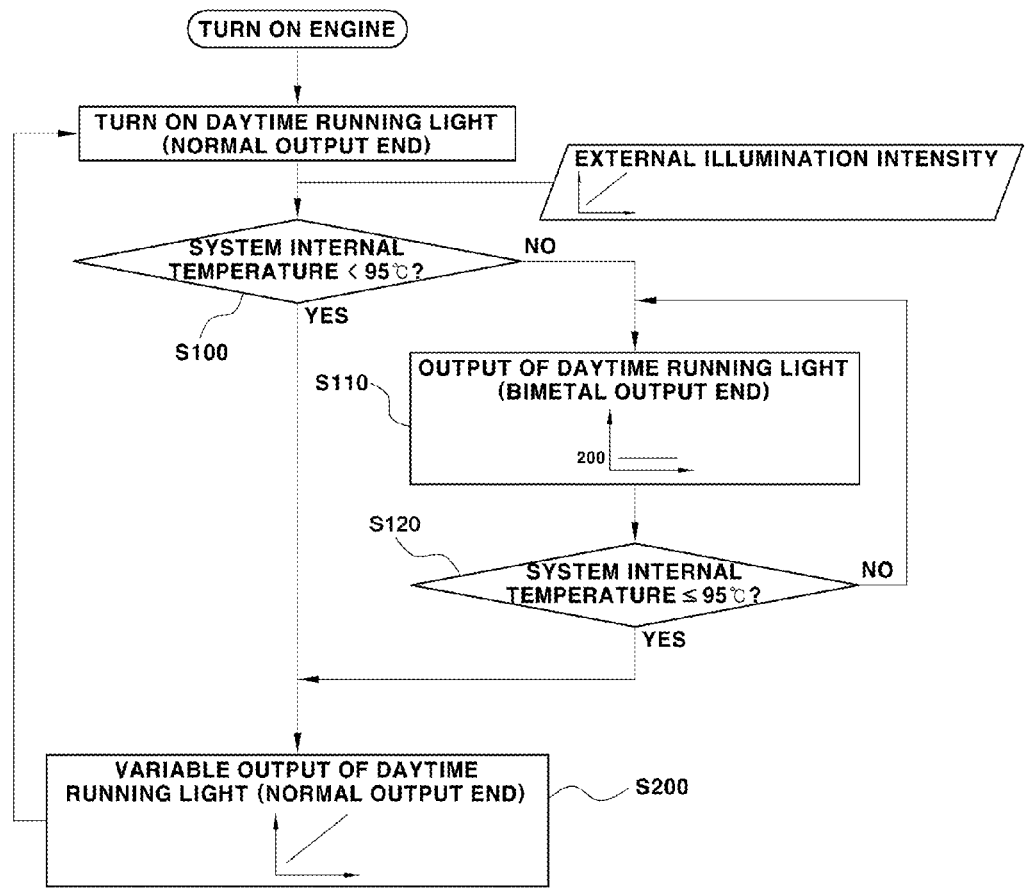
FIG. 5 is a flowchart illustrating an operation of the exemplary daytime running light apparatus of FIG. 3, for a vehicle according to the present invention.

Hereinafter, FIG. 3 is a view illustrating a configuration of a daytime running light apparatus for a vehicle according to various embodiments of the present invention, FIG. 4 is a graph illustrating an operational state of the daytime running light apparatus for a vehicle according to various embodiments of the present invention, and FIG. 5 is a flowchart illustrating an operation of the daytime running light apparatus for a vehicle according to various embodiments of the present invention.

As illustrated in FIG. 3, the daytime running light apparatus for a vehicle includes the controller 200 which controls a light amount of the daytime running light in accordance with illumination intensity or brightness at the periphery of the vehicle. The controller 200 is provided with a bypass module 210 which checks whether a temperature reaches a limit temperature concerning damage to the interior of the lamp 100 when it is determined that the vehicle is at an intensely hot location, and selectively blocks the output of the lamp 100. To this end, the controller 200 is connected to a Global Positioning System (GPS) receiver 220 which provides position information of the vehicle.

The bypass module 210 serves to prevent damage to the system which is caused by an increase in internal temperature, and an operation thereof will be described below in detail with reference to the graph and the flowchart illustrated in FIGS. 4 and 5. First, when it is confirmed through the GPS receiver 220 that the vehicle is positioned at an intensely hot location, for example, Kuwait where a mid-day temperature is above 40° C., the internal temperature of the system including the lamp 100 and the controller 200 is increased, due to a peripheral temperature, to a temperature equal to or higher than the predetermined limit temperature concerning damage to the system. In this case, it is checked whether the system internal temperature reaches approximately 95° C. of the predetermined damage limit temperature in accordance with the peripheral temperature due to the nature of location (S100), and when it is confirmed that the system internal temperature is lower than approximately 95° C., the controller 200 controls the lamp 100 so that the daytime running light may be normally output (S200). In this case, if it is confirmed that the system internal temperature is equal to or higher than about 95° C. (S100), the controller 200 restricts the output of the lamp 100 by forcibly decreasing the luminous intensity of the daytime running light down to approximately 200 cd by using the bypass module 210 (S110), thereby minimizing the likelihood of damage to the system caused by a problem of heat resistance performance. Thereafter, if the system internal temperature becomes about 95° C. or lower through the aforementioned processes (S120), the daytime running light is allowed to be normally output by the lamp 100 (S200). Here, the bypass module 210, which selectively blocks the output of the lamp 100 as described above, uses a bimetal which is bent opposite to a portion having a large coefficient of thermal expansion while the portion expands when a temperature is increased, and then returns to the original state when the temperature is decreased, thereby bypassing an electric circuit. The bypass module 210 allows only the minimum amount of electric power to be applied to the controller 200, such that a system capacity is decreased to 50% or less, thereby effectively decreasing the system internal temperature.

In the various embodiments of FIGS. 3-5, even though the illumination intensity outside the vehicle reaches about 100,000 lx, the daytime running light inevitably has low luminous intensity of about 200 cd in order to decrease the internal temperature of the system including the lamp 100 and the controller 200, but it is possible to minimize the likelihood of damage to the system due to the internal temperature, and consequently to effectively protect the daytime running light system at an intensely hot location. In the various embodiments of FIGS. 3-5, a state of the daytime running light according to the operation of the bypass module 210 may be displayed on an instrument panel in the vehicle, and thus, the driver may effectively recognize a turned-on state of the daytime running light.

According to the present invention, since the light amount of the daytime running light is changed in accordance with illumination intensity or brightness at the periphery of the vehicle, it is possible to allow the driver to safely drive the vehicle by improving performance of recognizing the daytime running light, and it is possible to prevent light blindness to a driver in the oncoming vehicle and a pedestrian.

In the present invention, the peripheral illumination intensity and brightness are sensed by the photo sensor and the rain sensor basically mounted in the vehicle, thereby reducing manufacturing costs.

In the present invention, when the internal temperature of the system becomes the predetermined damage limit temperature or higher, the system capacity is decreased to 50% or less by bypassing the electric circuit, thereby minimizing the likelihood of damage to the system caused by a problem of heat resistance performance.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A daytime running light apparatus for a vehicle, comprising:
    a lamp disposed in a daytime running light for a vehicle, configured to receive information about a vehicle starting condition, and determine whether to turn on the daytime running light; and
    a controller coupled to the lamp to control an amount of light of the daytime running light in accordance with illumination intensity or brightness at a periphery of the vehicle,
    wherein the controller is adapted to increase the amount of light of the daytime running light in proportion to an increase in illumination intensity or brightness at the periphery of the vehicle.

2. The daytime running light apparatus of claim 1, wherein the controller receives information relating to the illumination intensity or the brightness at the periphery of the vehicle from a photo sensor and a rain sensor pre-installed in the vehicle.

3. The daytime running light apparatus of claim 1, wherein the controller comprises a bypass module to check whether a temperature reaches a limit temperature relating to damage to the interior of the lamp and to selectively block the output of the lamp when it is determined that the vehicle is positioned in an intensely hot location.

4. The daytime running light apparatus of claim 3, wherein the controller is coupled to a Global Positioning System (GPS) receiver which provides position information of the vehicle.

5. The daytime running light apparatus of claim 3, wherein the controller controls for a state of the daytime running light according to an operation of the bypass module to be displayed on an instrument panel in the vehicle.

\* \* \* \* \*